United States Patent [19]
Merrill

[11] 3,832,458
[45] Aug. 27, 1974

[54] HYDROPHILIC SILICONE COMPOSITION AND METHOD

[75] Inventor: Edward W. Merrill, Cambridge, Mass.

[73] Assignee: Trustees of the Charles River Foundation, Boston, Mass.

[22] Filed: Dec. 6, 1971

[21] Appl. No.: 205,156

[52] U.S. Cl. .................................. 424/19, 128/260
[51] Int. Cl. ...................... A61k 27/12, A61m 7/00
[58] Field of Search ....................... 424/19; 128/260

[56] References Cited
UNITED STATES PATENTS

| | | | |
|---|---|---|---|
| 3,279,996 | 10/1960 | Long et al. | 424/19 |
| 3,608,549 | 9/1971 | Merrill | 128/260 |

FOREIGN PATENTS OR APPLICATIONS

| | | |
|---|---|---|
| 1,130,099 | 5/1955 | France |
| 1,130,100 | 5/1955 | France |
| 2,088,597 | 12/1971 | France |

*Primary Examiner*—Shep K. Rose
*Attorney, Agent, or Firm*—Kenway & Jenney

[57] ABSTRACT

A water permeable composition comprising a copolymer of a polysiloxane and N-vinyl pyrrolidone wherein the N-vinyl pyrrolidone is distributed through the thickness of the composition. The composition is useful for forming capsules containing a water soluble drug which can be implanted in an animal to distribute the drug thereto.

26 Claims, 4 Drawing Figures

PATENTED AUG 27 1974     3,832,458

HYDROPHILIC SILICONE COMPOSITION AND METHOD

This invention relates to a water-permeable silicone composition and to capsules prepared therefrom.

Implantable capsules made from polysiloxanes for controlled release of drugs and other agents are described in U.S. Pat. No. 3,279,996 to Long and Folkman. These capsules can be employed for the prolonged release of medications soluble in pure polysiloxanes, such as the estrogens, progesterone or other hormones highly insoluble in blood plasma. However, these capsules are not useful for water-soluble medications including ensymes such as insulin, hormones such as adrenocorticotropins, calcitonin, nitroglycerine, and spermicidal agents such as hexyl resorcinol, because they have extremely low solubility in conventional silicone (polysiloxane) material, and therefore the rate of permeation through capsular walls sufficiently thick to be mechanically acceptable is negligibly small.

On the other hand, medications significantly soluble in water pass through hydrophilic membranes such as cellophane. A difficulty experienced with cellophane or other hydrophilic membranes is that, to a large extent, the permeability depends upon the preconditioning of the membrane with water or a body fluid, and very significant swelling of the membrane from a dry state occurs when placed in contact with water. Thus, when placed inside a living organism, a slow-releasing capsule wall made of only hydrophilic material will expand vastly when brought into contact with body tissue, thereby significantly increasing its permeability to the contained materials as well as setting up significant osmotic stresses in its wall, which may cause it to rupture. Furthermore, many of the common hydrophilic materials cause inflammatory reaction when implanted in the living tissue, and others are known to be carcinogenic. Thus, silicone polymers which are noted for causing little or no inflammatory reaction and for being substantially non-carcinogenic when implanted properly and in a sufficiently small configuration, have been preferred.

The present invention provides a composition comprising a copolymer of a silicone elastomer and N-vinyl pyrrolidone which has limited but significant permeability toward water soluble materials and the degree of permeability can be regulated by controlling the amount of N-vinyl pyrrolidone and the method of forming the layer through which permeation is derived. These compositions also are permeable to lipid materials but to a lesser extent as compared to silicone polymers. Accordingly, the compositions of the invention provide substantial advantages over silicone polymers. In one embodiment, the present invention also provides an implantate such as a capsule, cartridge or tube with walls, formed from the N-vinyl pyrrolidone-silicone copolymer that can be implanted or inserted in a living organism for the controlled release of water-soluble or lipid medications.

Implantable capsules produced from this composition have significant mechanical strength, very high purity and are devoid of unwanted elutable components that might cause irritation if released into surrounding living tissue. Furthermore, the composition of the invention can be shaped and sealed to form an implantable capsule containing a medication by a process which prevents denaturing the medication.

It is known that N-vinyl pyrrolidone is infinitely soluble in water as is the polymer produced therefrom, poly(N-vinyl pyrrolidone). Because of the high water solubility of monomeric N-vinyl pyrrolidone and its polymer; it would be unobvious that it would have any solubility in such a hydrophobic material as silicone, either in the uncrosslinked or in the crosslinked state. Yet, I have found that the monomer, N-vinyl pyrrolidone is absorbed by limited solution in a silicone elastomer such as polydimethyl siloxane, polymethyl-vinyl siloxane, polyphenylmethyl siloxane, polydiphenyl siloxane and interpolymers thereof. The composition is formed by impregnating an uncrosslinked or previously crosslinked silicone elastomer with N-vinyl pyrrolidone and subjecting the resultant composition to ionizing radiation. The ionizing radiation crosslinks the silicone, if not previously crosslinked, and causes grafting of poly[N-vinyl pyrrolidone] chains to the crosslinked silicone matrix to form a mechanically stable water-permeable composition wherein the grafted N-vinyl pyrrolidone is distributed substantially homogeneously throughout the silicone.

The N-vinyl pyrrolidone can be employed in amounts up to the saturation level in the silicone elastomer. For example, in poly[dimethyl covinyl methyl siloxane] having 0.14 mol percent vinyl groups, the solubility of N-vinyl pyrrolidone is about 2 weight percent at 25°C.

The N-vinyl pyrrolidone can be admixed either alone or dissolved in a solvent which also acts as a solvent for the silicone elastomer. Suitable solvents include benzene, toluene and xylene. For example N-vinyl pyrrolidone may be dissolved in toluene, provided that the volume percentage of toluene is not greater than about 70 percent. Since toluene is soluble in silicones, it is possible also to introduce N-vinyl pyrrolidone into polysiloxanes of the types described above, by exposing the silicone to a solution of N-vinyl pyrrolidone having a concentration thereof greater than 30 volume percent. When toluene is used, care must be exercised to select the appropriate ratio of N-vinyl pyrrolidone to toluene and to limit the amount of toluene imbibed into the silicone. If excessive imbibition of toluene occurs, the toluene will tend to associate with the polysiloxane, leaving the N-vinyl pyrrolidone to separate into individual globules thereby producing turbidity in the mixture.

There are three convenient ways by which the content of N-vinyl pyrrolidone monomer in the silicone elastomer may be regulated. In one method, the silicone is crosslinked prior to exposure to N-vinyl pyrrolidone monomer. The higher the degree of crosslinking, the lower is the amount of N-vinyl pyrrolidone absorbed, but under all reasonable conditions of prior crosslinking the amount absorbed at equilibrium is still a significant fraction of the amount absorbed by uncrosslinked polymer at equilibrium. A second method is based upon limiting the contact time of the N-vinyl pyrrolidone and silicone. Whether the silicone elastomer be crosslinked or not crosslinked, if sheeted silicone material is exposed to monomers N-vinyl pyrrolidone for short time periods (e.g., several minutes in the case of 1 mm thick sheets) then removed from contact with the pure monomer, the monomer already dissolved in the silicone will eventually diffuse throughout the silicone material until its concentration is uniform, provided the specimen is sealed such as in the closed container to prevent evaporative loss of the monomer. The ultimate concentration can be any fraction of the equilibrium concentration corresponding to exposure to pure monomer.

A third procedure is based upon the fact that polymeric N-vinyl pyrrolidone is infinitely soluble in its monomer, but is totally insoluble in silicone elastomer. When slabs of silicone elastomer are contacted with solutions of poly[N-vinyl pyrrolidone] in its monomer, one finds that the higher the polymer concentration of the solution, the less is the concentration of monomer absorbed by the silicone elastomer at equilibrium.

The content of graft-copolymerized N-vinyl pyrrolidone will of course depend in part on the content of monomeric N-vinyl pyrrolidone in the silicone elastomer at the time of the grafting process. In addition, using ionizing radiation, one may vary the fractional polymerization of the dissolved N-vinyl pyrrolidone. For example, a radiation dose of 5 megarad will convert substantially all of the monomer to polymer, whereas a dose of 0.25 megarad delivered by a Van der Graaff generator over a period of several seconds will result in polymerization of 10 to 40 percent of the monomer depending on such variables as temperature, oxygen content of the surrounding gas, etc. Thus by using low radiation doses, and subsequently vaporizing or eluting unreacted N-vinyl pyrrolidone monomer, one can control the amount of grafted N-vinyl pyrrolidone.

When the silicone elastomer is left in contact with liquid monomeric N-vinyl pyrrolidone during irradiation with ionizing radiation, additional prolific grafting at the interface occurs between the elastomer and the monomer, leading to a much higher local concentration of grafted N-vinyl pyrrolidone. Because monomer avidly dissolves in previously grafted N-vinyl pyrrolidone polymer, continuing irradiation in the presence of monomer will result in much greater incorporation of N-vinyl pyrrolidone. With high intensity electron sources such as the Van der Graaff generator, highly anisotropic grafted materials may be produced because the rate of free radical generator productivity of grafting is so much greater than the rate at which monomer can diffuse into the matrix. Thus anisotropic membranes can be made by exposure of silicone elastomer as a thin sheet to monomeric N-vinyl pyrrolidone during Van der Graaff irradiation, which upon subsequent soaking in water roll into tight spirals because of the much greater solubility of water on one side of the sheet than on the other.

When uncrosslinked silicone elastomer is allowed to absorb monomeric N-vinyl pyrrolidone at 25°C to a state of equilibrium, the weight gain is about 2 percent of the original.

When this material is removed from the monomer and is irradiated by a Van der Graaff generator with a 5 megarad dose, and then soaked in water, the equilibrium water content is about 15 percent of the original silicone elastomer.

If, on the other hand, the silicone elastomer, in the form of a layer about 1 mm thick sheet, having previously been saturated with monomeric N-vinyl pyrrolidone, is left in contact with the same on one side during Van der Graaff irradiation, the dose being 5 megarads at 3 million electron volts in a period of about 10 seconds, it is found that after washing away the superficial polymerized NVP, the silicone surface thereunder is transferred into a strongly hydrophilic slippery layer. The equilibrium water content of this specimen, is now close to 25 wt percent based on the original silicone polymer. Furthermore, upon drying this specimen, the surface that was in contact with monomeric NVP at the beginning of the irradiation is glossy and has low coefficient of friction. Upon rewetting this surface, it becomes rehydrated.

Alternatively, when it is desired to graft a water-wettable surface to the N-vinyl pyrrolidone — impregnated silicone, other vinyl monomers that form hydrophilic polymers by radiation polymerization can be employed. Suitable vinyl monomer include hydroxy alkyl acrylates such as glyceryl methacrylate and tetraethylene glycol dimethacrylate. However, the use of these materials is less desirable than N-vinyl pyrrolidone in forming implantable capsule since they tend to form glassy polymers. To render these polymeric surfaces more pliable, they can be dissolved in an inert solvent such as glycerol, ethylene glycol polyethylene glycol or the like prior to irradiation.

By limiting the amount of N-vinyl pyrrolidone that has access to the silicone prior to irradiation as explained above, by controlling the time and rate of irradiation, and by irradiating in the presence or absence of monomeric N-vinyl pyrrolidone copolymerized materials can be prepared having widely variable preselected value of grafted N-vinyl pyrrolidone, of equilibrium water content, and of anisotropy or isotropy. Thus, membranes can be prepared for the controlled release of peptides such as insulin, the hormone ACTH, and other drugs and medicaments with significant water solubility. Grafting of the N-vinyl pyrrolidone into the silicone elastomer is demonstrable following irradiation, by soaking the finished crosslinked material in a solution of toluidine blue or other intense water soluble stains. It will be observed that such stains either penetrate uniformly throughout the film or show maximum intensity at the interface with diminishing intensity of coloration in the interior depending on whether the specimen was irradiated in the absence or presence of the monomer.

A method for forming implantable capsules and the capsules of this invention are more fully described with reference to the accompanying drawings.

Figure 1:
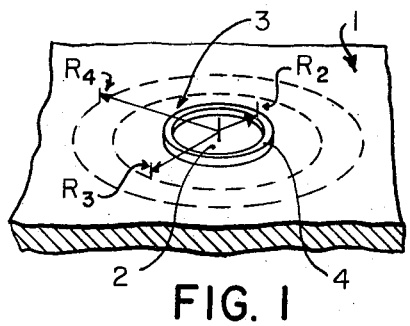
FIG. 1 is a top view of a partially crosslinked silicone sheet.

Referring to FIG. 1, a thin slab 1 of polysiloxane gum stock, free of any chemical crosslinking agents, optionally containing as a reinforcing filler such as fume silica is provided. A circular volume 2 of the thin slab 1 is contacted with N-vinyl pyrrolidone monomer until the content of the same within this area has reached the desired value and it is distributed through its thickness. Because of the thinness of the silicone film 1 compared to the radius $R_2$ the diffusion takes place from front to back without significant radial diffusion. The limit of diffusion in FIG. 1 is illustrated by the radius $R_2$ which defines the boundary between the silicone containing the N-vinyl pyrrolidone and the surrounding silicone without this monomer. It is understood of course that this is an approximate boundary inasmuch as the lateral diffusion necessarily takes place at a slow rate.

Figure 2:
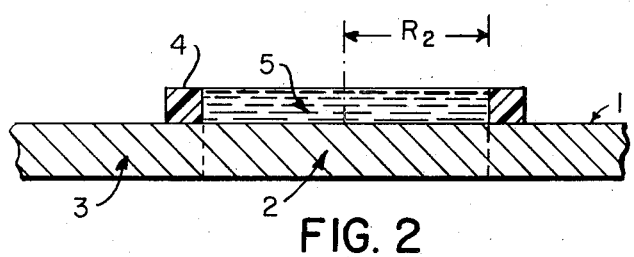
FIG. 2 is a cross-sectional view of a silicone sheet with a pool of monomeric N-vinyl pyrrolidone confined by a barrier.

FIG. 2 shows a method wherein contact of the monomer is conveniently effected. A Teflon ring 4 having an approximate radius $R_2$ is placed on the horizontal silicone sheet 1 so as to contain a shallow pool of monomer 5 which diffuses into the underlying silicone elastomer.

Figure 3:
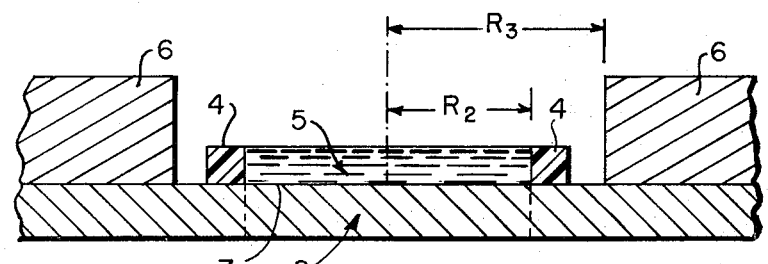
FIG. 3 is a cross-sectional view of the silicone sheet under a radiation shield with aperture.

As shown in FIG. 3, the sheet 1 then is placed in a metal shield 6 having an aperture of the radius $R_3$ the aperture being concentric with the circular volume 2 containing the N-vinyl pyrrolidone. For high ultimate water content, it is desirable to leave the ring 4 and pool of monomer 5 of FIG. 2 in place during irradiation. This will produce a highly hydrophilic surface 7 over the circular volume 2. The sheet, with the shield thereon, then is exposed to ionizing radiation from a Van der Graaff or similar generator, a preferred dose being about 5 megarads. This produces crosslinking of all the silicone material within the radius $R_3$ and additionally grafting of the N-vinyl pyrrolidone monomer into the silicone in the circular volume 2 thereby creating a water transmitting window of area 2. Beyond radius $R_3$, in area 3 the crosslinking density rapidly drops off to zero well before radius $R_4$. Pieces thus made are eluted in cool water for indefinitely long periods of time using only the gentlest support to prevent flow of the uncrosslinked material beyond the radius $R_3$. In this manner, unreacted monomer and non-grafted polymeric N-vinyl pyrrolidone may be eluted from the silicone stock prior to use of this material for encapsulation.

For the purpose of encapsulating a drug or medicament it is convenient to form a lenslike capsule from two identical disc of radius $R_4$ (see FIG. 1) after these discs have been washed of all elutable hydrophilic material. The medication is centrally positioned between the circular volumes 2 of the respective discs which are then brought together with their margins defined between radii $R_3$ and $R_4$ being pressed together into homogeneous coalescence. If irradiation was accomplished with excess monomeric NVP so as to produce highly hydrophilic surfaces 7, and thus anisotropic circular volumes 2, it is preferable to place the surfaces 7 toward each other and next to the medicament. A capsule may now be formed using ionizing radiation by shielding the central area within which the medicament is contained so as to prevent damage by irradiation, and then irradiating the marginal area so as to effect crosslinkng. The process of crosslinking the wall material of the capsule without denaturing a contained medicament is more fully described in my copending application entitled "Method for Forming Implantable Capsules from Silicone Rubber," U.S. Ser. No. 200,560, filed Nov. 19, 1971.

Figure 4:
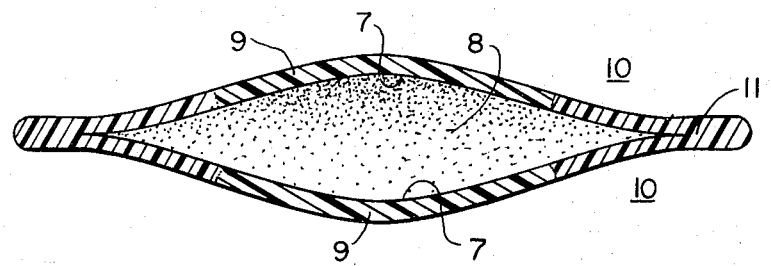
FIG. 4 is a cross-sectional view of a capsule of this invention.

The product capsule is illustrated in FIG. 4 wherein 8 represents the enclosed medicament substance, 9 represents the copolymer of silicone and N-vinyl pyrrolidone through which drug 8 will diffuse when brought into contact with body fluid, 10 represents essentially pure silicone crosslinked by ionizing radiation in the first process, 7 represents the inner surface of 9 which may be highly hydrophilic and 11 represents the homogeneous crosslinked silicone produced by joining the margins of the separate surfaces of the lens. Thus the medicament 8 is contained within a seamless capsule, the body of which is the inert silicone, in which there are two "windows" 9 through which the drug may diffuse. Clearly the rate of diffusion of the drug depends upon the thickness and area of the circular volumes 2 and the content of and distribution of grafted N-vinyl pyrrolidone in the copolymeric material 9 formed within the circular volumes 2.

The following example illustrates the present invention and is not intended to limit the same.

EXAMPLE I

A capsule was prepared for releasing ACTH hormone using the method illustrated in FIGS. 1, 2, 3 and 4. Stauffer-Wacker silicone compound 06093 (polydiemthyl covinyl siloxane) was sheeted to a thickness of 1 mm. Circular sections of 2.5 mm radius were exposed to and saturated with N-vinyl pyrrolidone using Teflon rings of 2.5 mm inter radius, 3 mm outer radius and 1 mm thickness. The saturated sections were covered concentrically with 1 cm thick aluminum shields having apertures of 3.2 mm radius. The sheets were irradiated with 5 megarads at 25°C under a 5 MEV Van der Graaff generator, with a ½ mm deep pool of monomeric NVP still in contact with the upper surface of the silicone sheets. Following irradiation, the sheets were soaked in cold water for 48 hours. They were dried, and discs of 5 mm radius were stamped out concentric with the central circular areas. Circular lens shaped pellets of ACTH, 4 mm in diameter by 2 mm in maximum thickness were positioned concentrically between pairs of discs with highly grafted surfaces adjacent to the pellet, which then were shielded concentrically by lead rods of 3 mm radius. The outside margins of the pairs of discs were pressed together until they coalesced and then were exposed again to Van der Graaff 5 MEV radiation, amounting to 5 megarads. The capsules thus formed were seamless and were found to release ACTH at a uniform rate through the window surfaces in which N-vinyl pyrrolidone had been grafted, after the capsules were exposed to isotonic saline.

I claim:

1. A drug carrier for releasing a drug in the tissues of a living organism comprising a drug enclosed within a sealed seamless container, at least a portion of a wall of said container being in contact with the drug and comprising a copolymer of a polysiloxane and N-vinyl pyrrolidone wherein said N-vinyl pyrrolidone is in poly (N-vinyl pyrrolidone) chains grafted to a cross-linked polysiloxane elastomeric matrix, said copolymer having limited but significant permeability toward water soluble drugs, said drugs being centrally positioned within said seamless walls through which the drugs may diffuse, said seamless container affording useful rates of permeation of water soluble drugs, said walls being sufficiently thick to be mechanically acceptable and wherein said N-vinyl pyrrolidone is distributed throughout the thickness of the composition.

2. An implantate for releasing a drug in the tissue of a living organism comprising a drug enclosed in a sealed seamless container in accordance with claim 1 which is in the form of a capsule.

3. The drug carrier of claim 1 wherein the copolymer contains a reinforcing filler.

4. The drug carrier of claim 3 wherein the filler is fume silica.

5. The implantate of claim 2 wherein the copolymer contains a reinforcing filler.

6. The drug carrier of claim 1 having a hydrophilic polymer grafted to at least one surface thereof.

7. The drug carrier of claim 2 having a hydrophilic polymer grafted to at least one surface thereof.

8. The drug carrier of claim 3 having a hydrophilic polymer grafted to, at least, one surface thereof.

9. The drug carrier of claim 4 having a hydrophilic polymer grafted to at least one surface thereof.

10. The drug carrier of claim 5 having a hydrophilic polymer grafted to at least one surface thereof.

11. The drug carrier of claim 1 wherein the N-vinyl pyrrolidone is homogeneously distributed throughout the thickness of the composition.

12. The drug carrier of claim 1 wherein the drug is water-soluble.

13. The implantate of claim 2 wherein the drug is water-soluble.

14. The drug carrier of claim 4 wherein the drug is water soluble.

15. The implantate of claim 5 wherein the drug is water soluble.

16. The drug carrier of claim 6 wherein the drug is water soluble.

17. The drug carrier of claim 7 wherein the drug is water soluble.

18. The drug carrier of claim 8 wherein the drug is water soluble.

19. The drug carrier of claim 9 wherein the drug is water soluble.

20. The drug carrier of claim 10 wherein the drug is water soluble.

21. The drug carrier of claim 1 wherein the drug is ACTH.

22. A method for delivering a drug into an animal body which comprises implanting within the lining tissue of the body a drug carrier according to claim 1.

23. The method of claim 22 wherein at least one surface of said wall has a hydrophilic polymer grafted thereto.

24. The method of claim 23 wherein said grafted polymer is poly(N-vinyl pyrrolidone).

25. The method of claim 22 wherein the drug is water-soluble.

26. The method of claim 22 wherein N-vinyl pyrrolidone is homogeneously distributed throughout the thickness of the drug carrier.

* * * * *